United States Patent [19]

Karbachsch et al.

[11] Patent Number: 5,422,057
[45] Date of Patent: Jun. 6, 1995

[54] METHOD OF PRODUCING A FILTRATION MODULE FOR SEPARATING AND FILTERING FLUIDS IN A CROSS FLOW PROCESS

[75] Inventors: Massoud Karbachsch, Göttingen; Gerhard Strohm, Oestrich-Winkel; Wilfried Kaul, Weinshein; Wolfgang Hepp, Alzey; Herbert Radmacher, Bad Kreuznach, all of Germany

[73] Assignee: Seitz-Filter-Werke GmbH und Co., Bad Kreuznach, Germany

[21] Appl. No.: 56,032

[22] Filed: Apr. 30, 1993

Related U.S. Application Data

[62] Division of Ser. No. 754,917, Sep. 6, 1991, Pat. No. 5,225,080.

[30] Foreign Application Priority Data

Sep. 7, 1990 [DE] Germany ............. 40 28 379.8

[51] Int. Cl.[6] ................ B29C 39/08; B29C 39/10
[52] U.S. Cl. ................... 264/257; 55/DIG. 5; 264/258; 264/271.1; 264/277; 264/311; 264/DIG. 48
[58] Field of Search .......... 264/257, 258, 310, 311, 264/DIG. 48, 271.1, 277; 425/425; 55/DIG. 5

[56] References Cited

U.S. PATENT DOCUMENTS

| | | | |
|---|---|---|---|
| 3,492,698 | 2/1970 | Geary, Jr. et al. | 425/425 |
| 3,564,819 | 2/1971 | Neulander et al. | 96/4 |
| 3,925,037 | 12/1975 | Ward, III et al. | 96/4 |
| 4,190,411 | 2/1980 | Fujimoto | 264/311 |
| 4,414,172 | 11/1983 | Leason | 264/258 |
| 5,000,855 | 3/1991 | Nichols | 210/321.84 |
| 5,024,870 | 6/1991 | Jackson | 264/DIG. 48 |
| 5,192,478 | 3/1993 | Caskey | 264/DIG. 48 |

FOREIGN PATENT DOCUMENTS

| | | |
|---|---|---|
| 2920253 | 11/1979 | Germany . |
| 3127548 | 4/1982 | Germany . |
| 8231757 | 4/1983 | Germany . |
| 3317517 | 11/1984 | Germany . |
| 3441249 | 5/1985 | Germany . |
| 3442249 | 5/1985 | Germany . |
| 3507908 | 12/1988 | Germany . |
| 8905810 | 9/1989 | Germany . |

*Primary Examiner*—Jay H. Woo
*Assistant Examiner*—Duane S. Smith
*Attorney, Agent, or Firm*—Robert W. Becker & Associates

[57] ABSTRACT

A module for crossflow filtration, a method of making same, and a filtration device that accommodates at least one such module, which includes at least two multilayer filter units which are stacked on top of one another and are separated from one another by a respective spacer, with the module having at least one channel for unfiltered material and at least one filtrate channel that connects the filter units. The module further includes a sealing material ring for sealingly interconnecting peripheral portions of the filter units, with at least one edge section of the filter units being spaced from the sealing material ring to form the channels for unfiltered material. The layers of each individual filter unit are fused together at least at edge sections that are not embedded in the sealing material ring which, at edge sections of the filter units that are embedded therein, has a width that is sufficient to completely accommodate the filtrate channels.

4 Claims, 14 Drawing Sheets

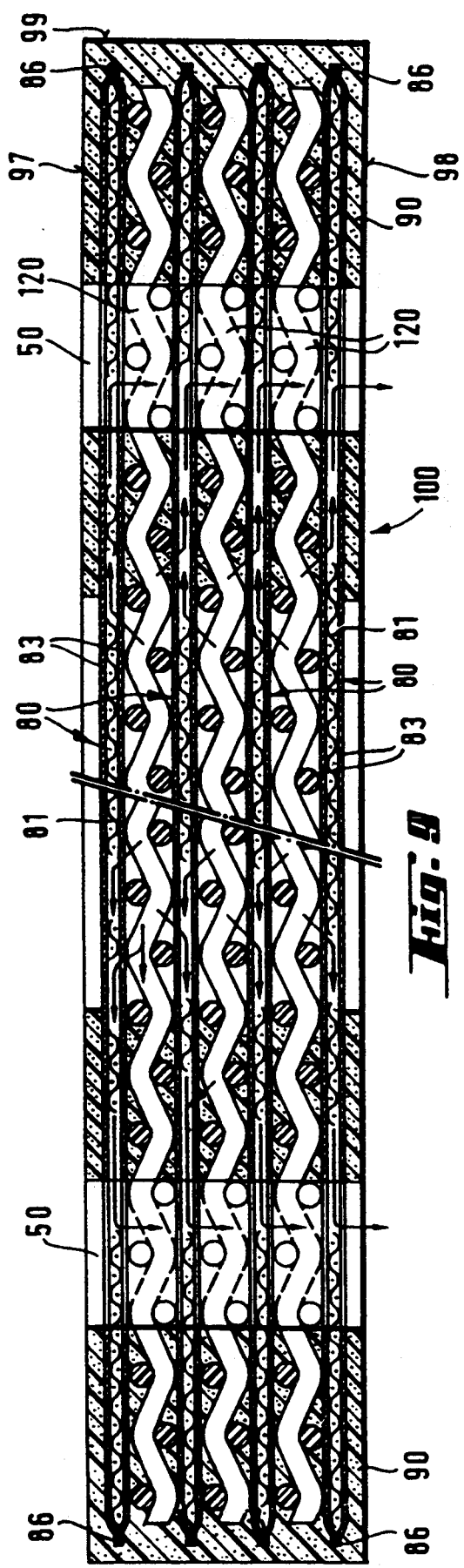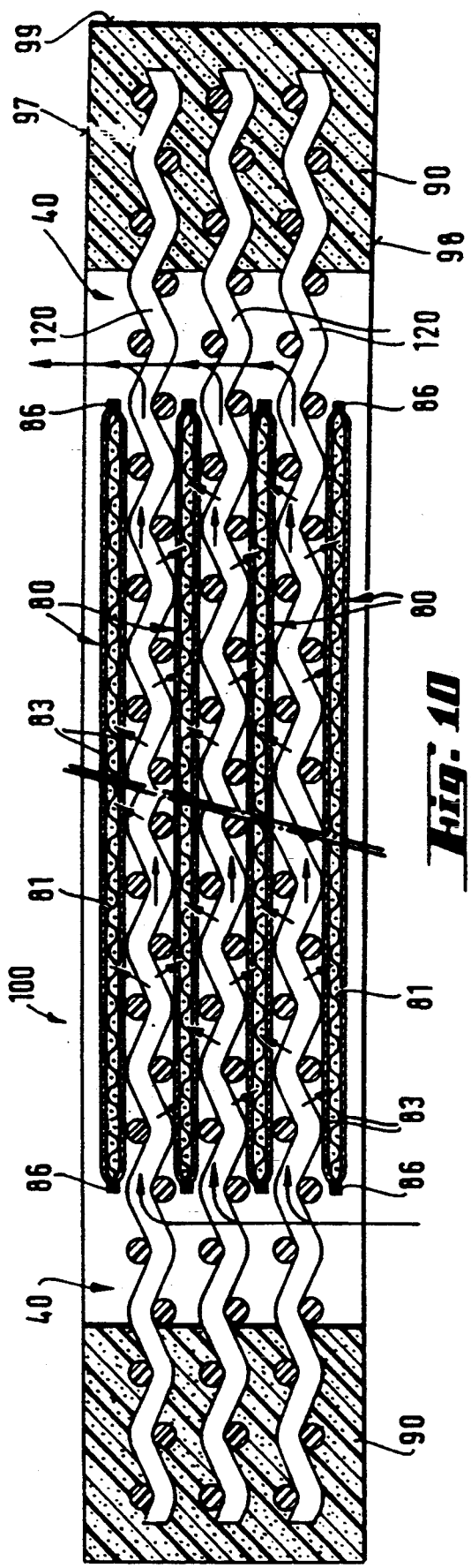

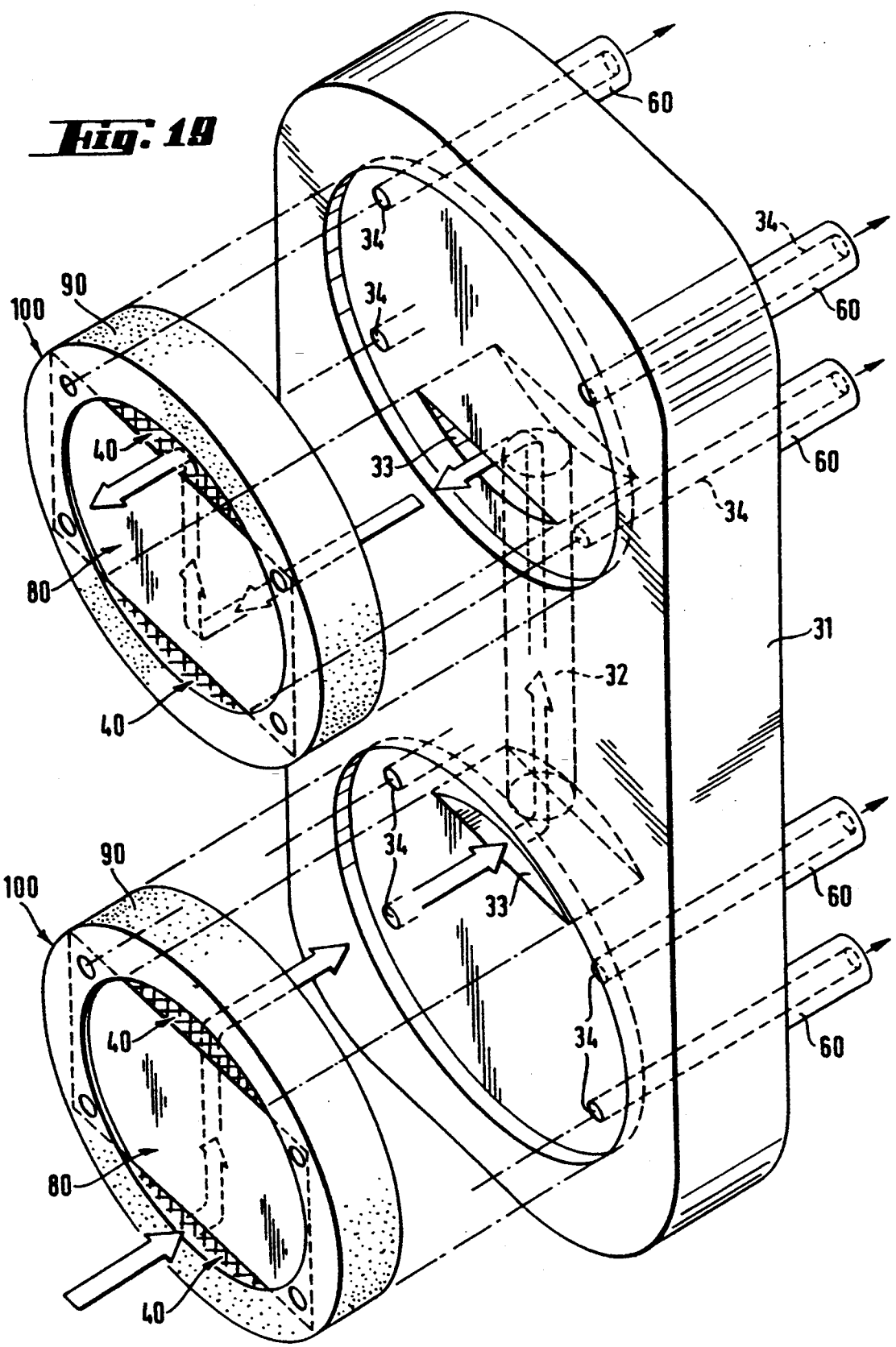

METHOD OF PRODUCING A FILTRATION MODULE FOR SEPARATING AND FILTERING FLUIDS IN A CROSS FLOW PROCESS

This application is a divisional of application Ser. No. 07/754,917, filed on Sep. 6, 1991, now U.S. Pat. No. 5,225,080.

BACKGROUND OF THE INVENTION

The present invention relates to a filtration module for crossflow filtration with at least two multilayer filter units which are stacked on top of one another, separated by a spacer in each case and connected to one another in a leakproof manner in the vicinity of the edge by means of sealing material which has an annular shape, and with at least one channel for unfiltered material and at least one filtrate channel which connects the filter units.

The invention further relates to a filtration device and a method for producing a filtration module for crossflow filtration.

Membrane filtering modules are frequently used for ultrafiltration, microfiltration or reverse osmosis in the crossflow method of operation in the beverage, pharmaceutical or chemical industries.

What is understood by crossflow filtration is a filtering method wherein the unfiltered material is delivered tangentially to the filtering surface (membrane) as turbulently as possible in order to clear the active membrane layer constantly by rinsing and to counteract the formation of a covering layer, such that the pores of the membranes do not clog prematurely. In this connection solid substances and macromolecules which cannot pass through the membrane are washed away with the tangential flow and are concentrated during the cycle. In this way a residue or unfiltered material is obtained. A small part of the circulating liquid penetrates the membrane in the form of a permeate or filtrate.

A filtering module or a filtering device of the above-mentioned type is known from DE-OS 29 90 253 and DE-OS 34 42 249, for example.

In DE-OS 29 20 253 intermediate layers of flat incompressible woven draining textile are used as spacers between filter units. Filtrate and unfiltered material channels are defined by bores within the edge regions of the filter units which are closed along their entire periphery by a sealing agent.

When the filtering units are constructed in this manner it is inter alia disadvantageous that when sealing the individual filter units in the region of the filtrate or unfiltered material channels on the upper or lower side of the edge regions of the filter units particular care must be taken as to exact arrangement of the regions which are alternately covered by sealing material or are free.

Likewise, when several filter units are stacked alternately with intermediate grid layers, the openings in the grid woven textile pieces which correspond to those openings in the filter units which are not surrounded at the top or at the bottom by sealing mass, have to be sealed in an expensive manner by introducing additional seals.

If several filter units with intermediate layers of woven textile are to be combined to form a module and if all the openings in the intermediate layer grids and the filter units are to be flush with one another, it is necessary to use a complicated process to glue the stack arrangement along its peripheral edges, especially the outer edge, with a polyurethane-based adhesive or with silicone and thus to seal it.

The high cost of this work, which is often carried out manually, results in high costs for the production of modules of this type. Furthermore, although the selection of a flat gridwork for the spacer layer has the advantage that a plurality of commercially available gridworks is present and these can be easily adapted to the geometrical requirements by punching, the disadvantage resulting therefrom is the relatively high danger of mechanical damage to the sensitive membrane structure by punched grid apertures.

Furthermore, in particular when a fine-meshed woven textile piece is used as a spacer, there is the possibility that under operational conditions a large number of grid points abut on the separating medium and thus the efficiency of the entire arrangement is reduced by a considerable degree.

DE-OS 34 41 249 aims to overcome this disadvantage by bridging the grid regions which are located in the region of the distributing shafts and are to be kept open in the plane of the grid structure with essentially incompressible thin pressure distributing and protective discs for the separating medium. These are constructed in the form of an annular disc, strips, mask or frame according to the respective requirements.

However these discs must again, disadvantageously, be introduced in an additional work stage in order to bridge and seal the relatively large number of apertures in the individual layers which is typical for this type of filter unit.

A second group of publications comprises German Utility Models G 89 05 810 and G 82 31 757 as well as DE-OS 31 27 548.

In G 89 05 810 stacks of membrane pads which are sealed at their outer edges in a flow manner resistant to flow agents are disposed alternately with range spacers. Since the modules are to be used at relatively high pressures, as they are required in the reverse osmosis process, the spacers are constructed in the form of disc bodies, for example of suitable synthetic materials of high rigidity. In order to prevent the membrane of the filter units from being damages, the spacer elements are provided in a complicated manner with a plurality of elevated projections which project from the surface and on which the membrane pads abut with only a very small contact region. In this way although a very effective surface is gained, practical experience has shown that exactly this type of abutment point can lead to cracks or damage to the sensitive membranes. Moreover, at the low pressures in the ultra- and micro-filtration range a 100 percent sealing effect is not guaranteed with these seals. For this purpose pressures of up to 30 bars are required.

In addition to the passage openings for the flow medium which have to be especially disposed in the spacer, the construction of the filtrate channel is extremely costly since the latter is constructed by the opening of the inner spaces of the membrane pads into a central clamping bolt, wherein the bolt simultaneously fixes the stack and also penetrates corresponding central holes in all the stack elements which have to be disposed separately in each part. This can again only be brought about by using costly additional seals.

G 82 31 757 also proposes a separating plate as a spacer for stacks of filter units, however, the plate still has essentially all the disadvantages explained above in connection with G 89 05 810 with respect to the present invention.

In addition to the disadvantage of high production costs, the special construction of the separating plate also gives rise to the further disadvantage that unacceptable tolerances occur in the thickness of the plastics material plates which are mainly produced by the injection molding process, such that reliable and exact sealing in the region of the filtrate or unfiltered material channels, respectively, is not always provided.

In the case of DE-OS 31 27 548 incompressible supporting plates with channel grooves and apertures are premounted alternately with membrane filter units which are sealed at the edge side, to form a stack, and a free-flowing sealing agent is injected into the communicating sealing grooves and channels, which agent hardens in the compressed stack and in this way firmly combines it to form a stable box.

On the whole the disadvantage of a module of this type of construction is again the costly spacer plate. A further disadvantage is the sealing with a sealing material which has to be injected since the latter spreads in a non-uniform manner through the grooves and channels and thus leakages can lead to rejects.

The boxes produced in this manner are altogether incompressible and in a disadvantageous manner are additionally clamped between casing plates with main connections by means of a plurality of clamping bolts which have to be tightened by means of torque wrenches. Between several boxes mask seals of silicone or polyurethane are used which, however, cannot compensate the finishing tolerances of the casing plates and have only a limited ability to transfer the pressure of the two casing plates exerted by the clamp bolts to the individual modules.

A third group of documents, DE-OS 33 17 517 and DE-PS 35 7 908, deals with similar separating devices, wherein the prefrabricated membrane pads are stacked on top of one another, separated by a spacer.

The filtrate and unfiltered material channels are sealed by plastics material seals which are laid around two permeable rods which extend in the filtrate channel. The entire stack is disposed in an external plastics material casing and is fastened by screws. The module prepared in this manner is again especially inserted in a fine steel pipe. Apart from sealing problems which occur in the filtrate channel when the stack is compressed by two rods, in this case the membrane pads are pushed apart at the sides, which leads to an irregular flow. The membrane pads which are stacked in this manner crack at the lateral welding points if a pulsing counter pressure occurs, in the case of pulsation by pumps for example.

In contrast to the prior art the invention is thus based on the object of further developing with simple means a filtration module which can be stacked to form filtration devices such that fewer sealing elements are required for its sealing, and such that it can be produced more easily in a process which can be largely automated, wherein damage to the filter units during operation is avoided.

SUMMARY OF THE INVENTION

This object is achieved by a module, which is characterized in that the sealing mass ring is disposed at at least one edge section of the filter units, forming an unfiltered material channel at a distance from the filter unit; in that the layers of the filter units are welded in a leakproof manner at least at the edge sections which are not embedded in the sealing mass ring; and in that the sealing mass ring is formed in the edge sections of the filter units which are embedded in the sealing material such that it is wide enough to receive the filtrate channel completely.

At least one module of this type can be disposed in one of the casings which corresponds to the outer shape of the modules and thus provides a filtering device.

The achievement of the object according to the process comprises the following steps:
 a) stacking of a plurality of spacers alternately with filter units;
 b) aligning and fixing the stack arrangement in a casing mold, such that the filter units lie substantially on top of one another in an exactly coinciding manner;
 c) adding a predetermined amount of sealing material in the shaping casing in order to produce a ring of sealing material of suitable wall thickness and annular width;
 d) centrifuging the casing with stack arrangement and viscous sealing material, until the sealing material has prehardened;
 e) leaving the sealing material to harden completely; and
 f) disposing at least one bore vertically relative to the stack plane and through the sealing material in order to form at least one filtrate channel.

The filter units used for the modules may comprise the following layer structure:

Membrane, protective foil, woven draining textile pieces, protective foil and membrane.

In order to produce membrane or non-woven material filter units which are operable, they must be sealed. The simplest way of achieving this is by fusing or heat-sealing for example all five or all existing layers of a filter unit along the entire peripheral line according to a conventional method. In this way operable membrane filter units are obtained which collect a filtrate in their interior, in particular at the woven draining textile pieces according to the membrane used.

It is further also possible to weld the filter units only at parts of their peripheral region either completely or only in individual layers, for example in all layers only the vicinity of regions which are not embedded in the sealing material ring and/or partially in the peripheral regions which are embedded in the sealing ring, in order to allow these regions which are not welded completely to be sealed by sealing material of the sealing ring. In this connection as a useful side effect a particularly soft abutment of the membrane layers on the inner filter layers, for example on the protective foil can be achieved for example, since sealing material which has penetrated through non-welded openings displays this cushioning effect. In this connection it might be useful to take additional measures in order to protect the woven draining textile pieces for example by protective foils which are to be disposed around the draining foil in a U-shaped manner.

Principally all geometrical shapes are admissible for the outer shape of the filter units depending on the task. However, it has proven to be advantageous to select the geometrical shape of the filter units such that the effective surface of the membrane filter and of the flow conditions are optimized.

The regions of the filter units which are embedded in the sealing material ring cannot be produced in any desired small size for reasons of stability, furthermore, the sealing material ring is also to receive the filtrate channel.

The regions which are not or only partially flowed over in a crossflow method of operation can be controlled by the coordination of filter unit geometry and the number, size, shape and arrangement of the filtrate channels and of the unfiltered material channels in connection with the geometry of the inner edge of the sealing material ring.

Owing to economic reasons it should further be considered that, when selecting the filter unit geometry, blanks of filter materials which are as close as possible to the desired shape can be used. All rectangular, quadratic and arc-shaped geometrical shapes are particularly preferred, the latter in particular ensuring an extraordinary optimization of the flow technology and the effective surface of the membranes.

The spacers used according to the invention, consist of monofilamentary synthetic woven textile pieces. The thickness of the synthetic threads is optional, however thicknesses of approximately 0.1 mm to 2 mm are preferably used. The mesh size of the woven textile pieces or gridwork used may also be variable. Starting from very small mesh sizes of approximately 0.1 mm to approximately 1 mm, woven textile pieces or grids of a mesh size of up to 20 mm can be used. The use of relatively large-meshed spacers has several advantageous effects.

On the one hand only a small number of points of the spacer abut the membrane, the loss of effective surface being small.

On the other hand the mesh sizes may be of the order of magnitude of the diameter of the filtrate channels, i.e. when the filtrate channels are inserted no or only a few working edges are generated on the woven textile threads of the spacer, which later, during operation, could cause damage to the sensitive membranes. For this reason prior punching of the filtrate channel openings in the spacer can be avoided just as it is also superfluous in general in the case of the modules according to the invention to punch the spacers before the finishing process of the module, since, owing to the embedding of the spacers into the sealing material ring, a complete fixing and cushioning of the working edges in the region of the filter channels is achieved. In this way the sensitive membranes in this region cannot be damaged at all.

A further very important advantage lies in the fact that the woven textile pieces or gridwork of the spacer does not have to be recessed even in the region of the unfiltered material channel. The spacer may extend through the unfiltered material channel since, owing to its preferably large mesh size, the flow conditions are only influenced top a negligible degree. In a favorable manner the spacers are thus adapted to the form of the outer sealing material ring and in addition anchored therein completely or partially.

If in an advantageous manner spacers of woven textile pieces which consist of monofilamentary fibres with different thread strengths are used then, in addition favorable turbulence on the filter material surface can also be generated by a spacer of this type. In this way the formation of a filter layer on the membrane is made more difficult and additionally the removal of such a layer is facilitated if the latter can be removed and rinsed away in a backrinsing filter element by pump pulsation quasi in statu nascendi.

In order to form at least one unfiltered material channel the stack arrangement of filter units and spacers is surrounded by sealing material in an annular manner or embedded therein at its edge regions.

In this connection it is perfectly feasible to anchor the membrane and/or filter non-woven material units only at one region in the sealing material ring in each case, however, embedding at at least two peripheral sections in the sealing material is preferred for reasons of stability and flow characteristics, in order to accommodate the filtrate channel in the embedded region.

The sealing material ring may consist of any commercially available molded materials or inelastic or elastic materials which are used for sealing purposes, which are to be processed in a viscous state and are inert with respect to the unfiltered material. Preferably silicone material is used as elastic sealing material, or epoxy resins or polyurethane materials as rigid inelastic materials.

What is meant by a sealing material ring in this connection is any annular arrangement of any type which comprises an upper surface, a lower surface and also an outer and inner edge surface which, however, does not necessarily have to be circular with respect to its outer edge surface. The outer edge surface can be produced in any desired form, for example angular, irregular, etc. However, the inner edge surface of the sealing material ring is generally of annular form in dependence upon the method.

The annular sealing material fulfills various functions. For example it receives the spacers at a defined depth and the stacks of filter units and spacers, respectively, and thus gives stability to the entire module. By its outer edge surfaces it seals with respect to the exterior and by its inner edge surfaces defines the unfiltered material channel and the filter unit stacks. Furthermore the sealing ring is preferably constructed in such a width, i.e. the distance between the inner edge surface and the outer edge surface is sufficiently large such that the sealing material ring can accommodate at least one filtrate channel of a sufficiently large diameter. For example the diameter used for a filtrate channel is frequently approximately 5 to 6 mm and the sealing ring is generally approximately 2 cm wide and also approximately 2 cm high. In the case of large modules height and width may be as much as 5 cm.

The surfaces of the upper or lower side of the sealing material ring which are usually completely flat enable individual modules to be stacked without any problem. The surfaces, however, can have an additional structure, in particular continuous regions of different heights. In this connection continuous annular beads which are formed integrally with the surface of the sealing material ring and extend concentrically along the entire periphery, or extend only concentrically about the filtrate channels, prove to be particularly advantageous for elastic sealing materials. When inelastic sealing materials are used it is recommended to provide similar annular grooves on the upper and/or lower side of the sealing ring into which elastic seals are then inserted. When two modules are pressed together it is particularly advantageous if only one of the two adjacent sides is provided with the respective structure such that one side is flat. In this way optimum sealing of filtrate or unfiltered material channels is achieved.

Furthermore, in an advantageous manner the continuous annular beads may also be combined with projections which extend around the periphery of the filtrate channels. Depending on the task, other combinations of seals are also feasible of course. For example annular grooves about the filtrate channel with inserted elastic sealing rings, as well as a peripheral inner annular seal or, in the case of inelastic sealing material, grooves about the filtrate channel and two peripheral annular grooves with inserted corresponding sealing ring, in each case, on one surface only in each case, and similar other combinations.

In general one single module which is clamped into a corresponding casing as a module holder represents an operable filtration device. Normally, however, a plurality of modules are stacked such that they lie with their silicone rings on top of one another and a filtering device of any size can be obtained.

Under normal operational pressure of approximately 4 to 5 bars only a limited number of modules can be sealed relative to one another. If a large number of modules is to e stacked a correspondingly large force is required in order to compress the modules in a sealing manner. Since in such a case the elastic sealing materials which are preferably used could be compressed to a higher degree than desired, which would eventually lead to damage to the sensitive membrane, intermediate plates can be used which are laid between the modules.

When two modules are compressed these intermediate plates take up the excess force and guide it to an incompressible, peripheral bar; in this manner they prevent the sensitive membrane surfaces from being damaged. Furthermore, by means of defined reinforcements of the intermediate plates in those regions where the filter units are not embedded directly in the sealing material, it is possible to provide a given flow distance between the uppermost filter unit of one module and the lowermost filter unit of an adjacent module, as a result of which the flow conditions in the entire filter device are the same.

Furthermore, the intermediate plates may also comprise at their surfaces annular grooves or combinations thereof which extend either about the entire module or about the filtrate openings and into which seals may be inserted which then exert pressure on the flat inelastic sealing surfaces of the modules, for example, which, when intermediate plates are used, results in an additional sealing effect of the filtrate or unfiltered material channels. The modules in this connection are sealed by pressure, such that filtrate and unfiltered material sides are separated from one another forming corresponding delivery channels. These open into filtrate outlets for example.

The intermediate plates combine further advantages.

Although, in principle, owing to the fact that the openings and the unfiltered material channel, respectively, are very large, there is no significant increase in temperature, which otherwise would have to be taken into consideration owing to small flow cross-sections, and owing to the size of the openings in addition allowing a larger throughput capacity in comparison to known modules, it may still be necessary to cool the filtrate or unfiltered material depending on the field of use.

This is achieved by forming the intermediate plates as hollow plates which also comprise heating and cooling chambers in addition to filtrate and unfiltered material connections such that the products to be filtered can be heated or cooled during the filtration process.

In a manner similar to the intermediate plates, several stacks of modules may be connected via special end plates, which enable a plurality of filter devices to be operated in series or in parallel.

It is further possible to install any embodiment of the filtration device in corresponding movable or immovable systems together with a circulating pump, feed pump, pressure, temperature and flow monitoring devices. In this way the module according to the invention can be used universally in filtration devices.

The method of producing the modules according to the invention is characterized by simple practicability and large flexibility.

The filter units in the form of stacks are placed alternately with spacers and seals, if provided, into a mold to which a sealing material is delivered from the outside via a metering container and by means of hoses. If the entire system is rotated, the sealing material in the metering container rises and in this way can reach the mold via the holes. At the outer edge of the mold owing to the centrifugal forces a sealing ring is formed which has a suitable wall thickness and width and may assume different shapes depending on the casing shape selected by pouring in the filter units at at least one edge.

The centrifuging time depends inter alia on the hardening rate of the sealing material; only when the material has "prehardened" can the centrifuging process be terminated, otherwise the material will run in the casing.

In addition to the possibility of the sealing material penetrating through openings into filter units which are not or only partially welded and between spacers if provided, depending on the centrifugal force exerted the membrane can be wetted only on the surface or there is the possibility that the sealing material can penetrate into the membrane or even that the membrane can be completely penetrated by sealing material.

In principle a membrane is a very thin sponge depending on the type and construction with a thickness of approximately 150 to 300 $\mu$m. In this connection what is understood by surface wetting is that only the pores provided on the surface of the material are closed by the sealing material. If the centrifugal force in the production process is increased, the material can penetrate into half of the membrane thickness which can be time-controlled if desired. If centrifugal forces are high, centrifuging time relatively long and pore size large it is desirable in many cases that the sealing material completely penetrates the membrane or the non-woven material, i.e. can reach the filtrate side and thus ensure optimum anchoring of the material in the filter medium.

A main advantage of the method according to the invention and of the module consists in the fact that the bore for forming the filtrate channel can be provided at a later point in time. This is achieved in that by means of the amount of sealing material delivered a relatively wide silicone ring can be formed. Moreover, it is of course easily possible to modify the casing shape, i.e. annular grooves or annular elevations may be provided in the lid or base of the casing, such that on the sealing material ring on at least one of the side surfaces which is not at the edge at least one region of a different height is formed. This ensures that the already mentioned additional structures of the sealing material rings can be produced in one single working stage.

BRIEF DESCRIPTION OF THE DRAWINGS

The inventive concept is explained in more detail in several embodiments with reference to the enclosed drawings, in which:

FIG. 9 shows a section through a module according to the invention along line IX—IX of FIG. 1;

FIG. 10 shows a section through a module according to the invention along line X—X of FIG. 1;

FIG. 11b shows the top plan view of the module according to FIG. 11a;

FIG. 19 shows a perspective illustration of an end plate for the operation of two module rows in series.

DESCRIPTION OF PREFERRED EMBODIMENTS

Figure 1:
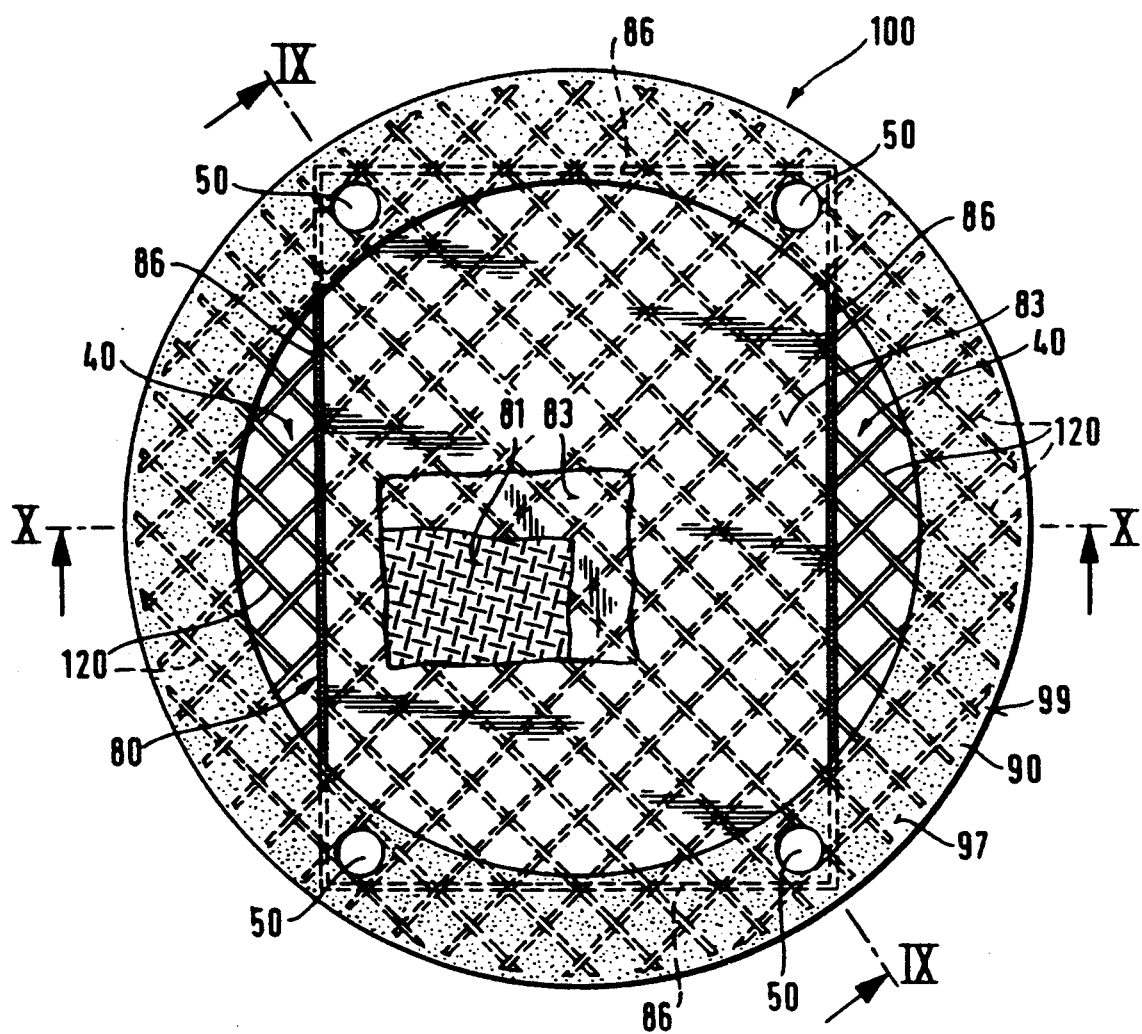
FIG. 1 shows the top plan view of a module according to the invention.

An embodiment of the filtration module 100 according to the invention, as shown in FIG. 1 for example, consists of a stack of filter units 80 alternately with spacers 120, which is embedded in a sealing ring 90, wherein the filter units 80 and the inner edge of the sealing ring 90 define two unfiltered material channels 40 and four filtrate channels 50 are guided through the sealing material 90, the spacers 120 and the filter units 80 in the sealing material ring. The sealing material ring 90 has inter alia an upper side 97 and an outer edge surface 99. The filter units 80 comprise peripheral welding 86. In the cut-away part of the filter unit 80 a membrane 83 and woven draining textile pieces 81 are further shown.

Figure 2:
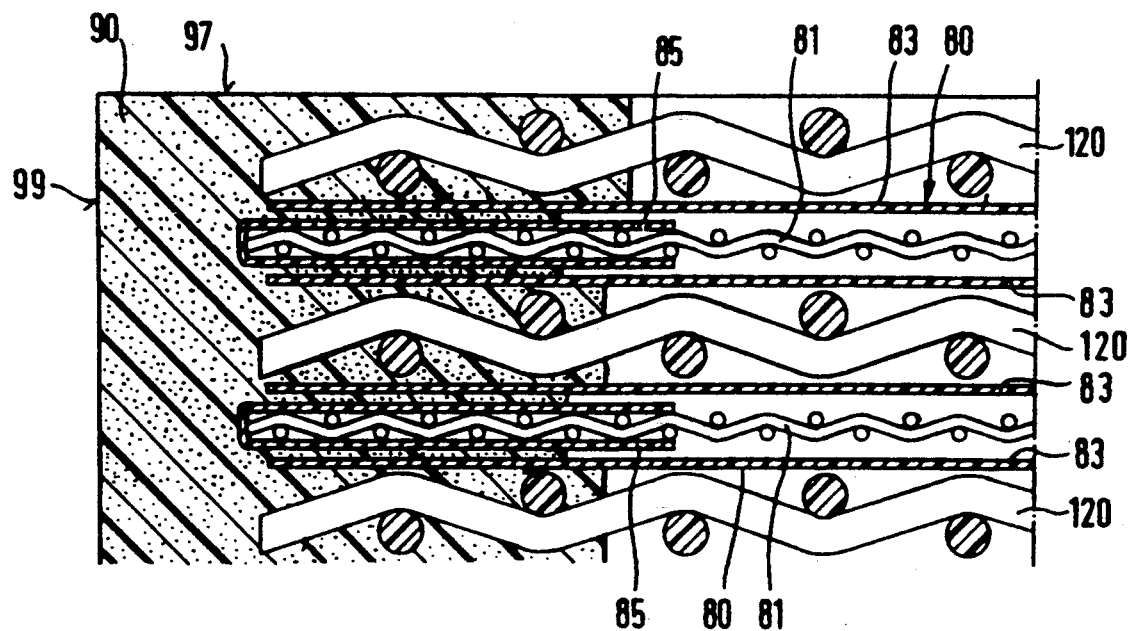
FIG. 2 shows a cross-section through the edge region of a module according to the invention with two filter units and three spacers, wherein the woven draining textile pieces are covered by a protective foil in a U-shaped manner.
Figure 3:
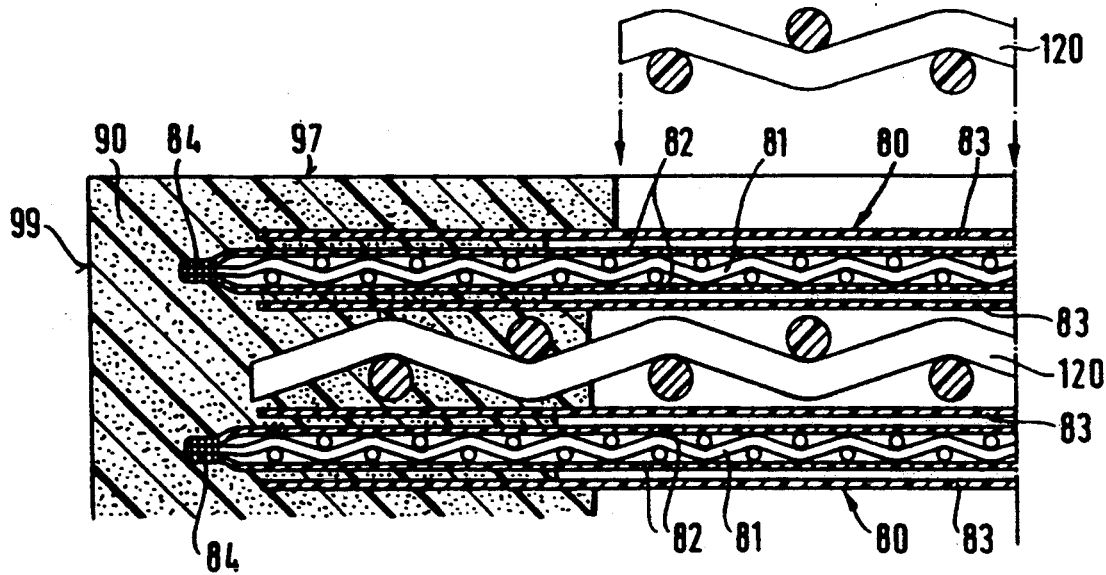
FIG. 3 shows the same view of a module as FIG. 2, wherein the protective foils and the woven draining textile pieces are welded to one another in each case.
Figure 4:
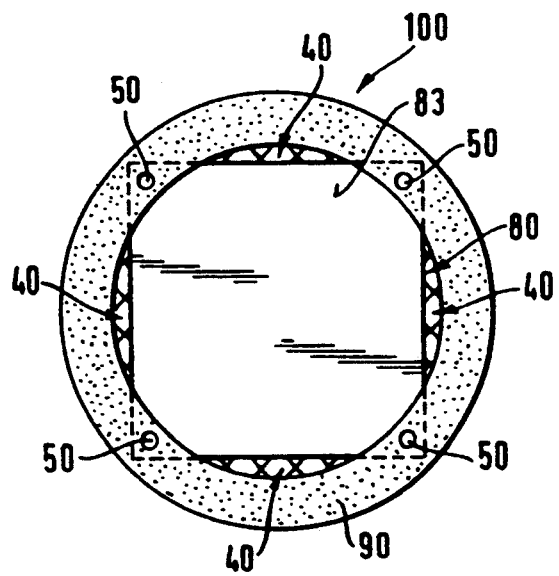
FIG. 4 shows the top plan view of a module according to the invention with filter units of quadratic geometrical shape.
Figure 5:
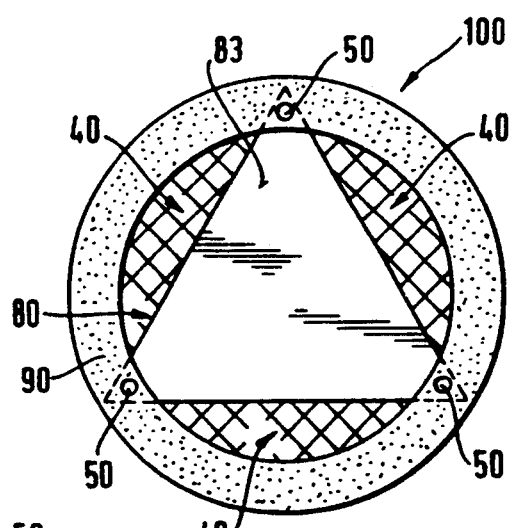
FIG. 5 is a representation similar to FIG. 4 of a module with filter units of triangular shape.

In FIG. 2 a cross-section through the edge region of a module 100 is shown, in the case of which two filter units 80 and three spacers 120 are disposed. In FIG. 3 the uppermost spacer layer 120 is merely indicated and in the further cross-sectional illustrations the uppermost and lowermost spacer layers 120, respectively, which usually are preferably provided, have been omitted for reasons of clarity.

In addition to welding 86 all layers of the filter unit 80 along their entire periphery, FIGS. 2 and 3 show further possibilities for sealing the filter units 80. They consist in welding the stacks of filter layers according to a conventional process only along the peripheral lines which are not embedded in the sealing material ring 90; the peripheral sections of the filter units 80 which are embedded in the sealing material ring 90 are then sealed by the sealing material of the sealing material ring 90 which thus provides two advantages since, in addition to the fixing and sealing of the filter units 80, it also ensures a particularly soft and protective support for the membranes 83 and thus prolongs their useful life.

In this connection it has proved to be particularly advantageous to protect the woven draining textile pieces 81 from being penetrated by the sealing material of the sealing material ring in order to preserve its full efficiency. FIG. 2 shows that by forming a U-shaped protective foil 85 which is guided around the woven draining textile pieces 81 at the non-welded regions which are embedded in the sealing material ring 90, the woven draining textile pieces 81 are protected from being penetrated by the sealing material and also the penetration intensity of the sealing material can be controlled in such a way that a protective sealing material pad is formed for the sensitive membrane 83, for example if the filter sections are rectangular, the foil 85 may cover the narrow sides of the woven draining textile pieces 81, which are embedded in the sealing material, and the longitudinal sides are welded as usual.

Since the application of this method does not have the same advantages for all geometrical shapes of filter units 80, a further method may also be applied.

The embodiment of the invention shown in FIG. 3 shows that if the peripheral sections which are embedded in the sealing material ring 90 are not welded, a similar effect as in FIG. 2—applicable for all geometrical shapes of filter units alike however—can be achieved by welding in a separate working stage the protective foils 82, which rest on the upper and lower sides of the woven draining textile pieces 81, at the peripheral sections 84 which are to be embedded in the sealing material ring 90 at least predominantly according to a known method. Subsequently corresponding membrane blanks 83 are laid on the upper and lower sides of this structure and are welded in a further working stage at the peripheral sections which are not embedded in the sealing ring 90 to the protective foil structure for the woven draining textile pieces. In this way at the peripheral sections which are not embedded filter units which are completely closed are produced and at the embedded peripheral sections filter units which are completely closed merely in the region of the protective foil for the woven draining textile pieces are produced, into which filter units the sealing material of the sealing material ring 90 can then penetrate between membrane 83 and protective foil 82 in each case in order to produce the above-mentioned effect.

Some particularly advantageous geometrical shapes for the filter units are shown in FIGS. 1 and 4 to 8.

The rectangular shape of the filter units (see FIG. 1) as well as the other angular blanks shown (FIGS. 4 to 7) allow a production of the filter units as close to shape as possible.

The number of filtrate channels 50 shown in FIGS. 1 and 4 to 7 is naturally not fixed either, nor is the relative size, in which they are illustrated. Larger or smaller, more or fewer filtrate channels 50 (but there must always be at least one filtrate channel 50) may also be provided.

The same is true for the number and size of the unfiltered material channels 40, wherein it can however generally be said that owing to the construction of the unfiltered material channels 40 which is large in comparison to the prior art, generally favorable flow relationships in the unfiltered material range are obtained.

Figure 6:
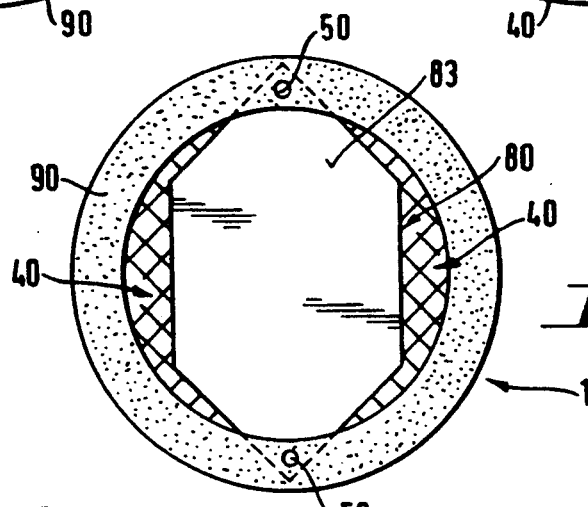
FIG. 6 shows similar to FIGS. 4 and 5 a module with filter units of hexagonal geometrical shape with a rectangular basic body with triangles mounted on the narrow sides.
Figure 7:
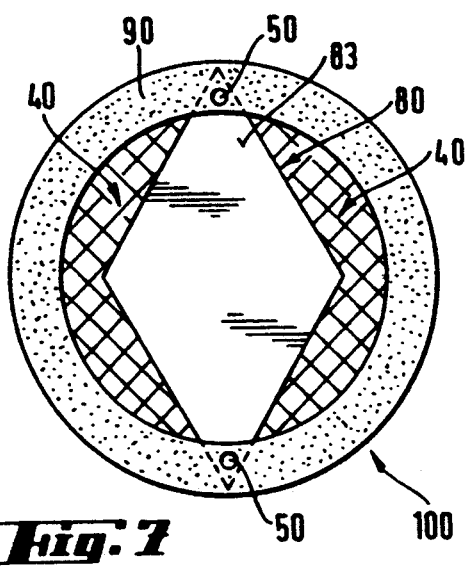
FIG. 7 shows similar to FIGS. 4, 5 and 6 a module with filter units of rhombic shape.
Figure 8:
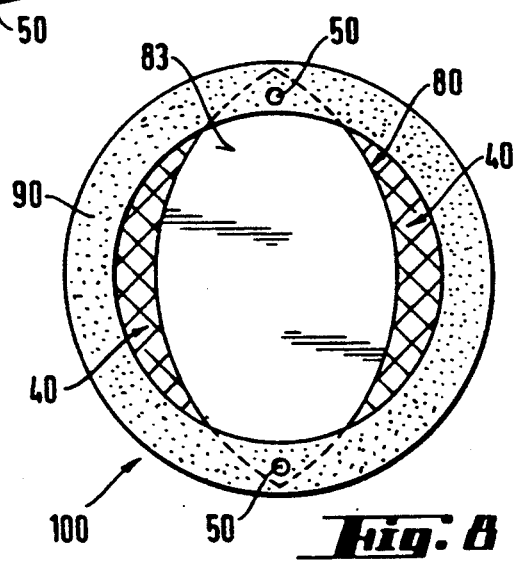
FIG. 8 shows similar to FIGS. 4 to 7 a module with filter units of a geometrical shape which is defined by the sectional surface of two circles.

With respect to the filtrate 50 and unfiltered material channels 40 it can be seen for example that in the case of a rhombic or hexagonal geometrical shape of the filter units (FIGS. 6 and 70 although only two filtrate channels 50 are provided, by these means the relative losses of effective filter surface are reduced by regions embedded in the sealing material ring 90. Furthermore in the case of these embodiments particularly large unfiltered material channels 40 are obtained.

However, if in contrast thereto the absolute efficiency of the membrane surfaces 83 in relation to the surface provided by the inner edge of the sealing material ring is considered, then as a result of a rectangular or quadratic geometrical shape (FIGS. 1 and 4) of the filter units optimum use of the existing surface is achieved, wherein smaller unfiltered material channels 40 which are still large enough for a resistance-free flow are formed of necessity.

The triangular shape (FIG. 5) is a compromise between the conditions described, whereas by using filter unit shapes which are defined by the sectional surface of two circles (FIG. 8), i.e. for example elliptical or arc-shaped blanks, both the relative looses—only two regions oat the tops are embedded forming two filtrate channels 50—and also the absolute losses—as a result of the arc-shaped edge regions of the blanks an unfiltered material channel 40 can be formed which is adapted to the inner edge of the sealing material ring—are kept small in the module such that the blind regions are minimized when the membranes 83 are flowed over.

The further construction of a module 100 is shown in FIGS. 9 and 10. A module may consist of any number of filter units 80. However, in a preferred manner a module 100 consists of approximately 10 to 12 filter units 80 which are stacked on top of one another. For the sake of simplification only four filter units 80 in each case are shown in FIGS. 9 and 10.

It is shown that the filter units 80 are disposed in layers or alternately with spacers 120. These so-called spacers 120 have the task of preventing the membrane surfaces of adjacent filter units 80 from abutting on one another under operational conditions and thus becoming ineffective. Furthermore the spacers 120 ensure with their own thickness or dimensions a defined gap distance between the filter units 80, since they represent a gridwork which is substantially incompressible. It is sufficient to provide one spacer 120 between the filter units 80 in each case, as shown, however in a preferred manner one spacer 120 may be mounted as the end of a stack of filter units 80 in each case, as shown in FIG. 2 for example.

The ring of sealing material 90 according to the invention may comprise completely flat surfaces 97, 98. These ensure that the stacking is simple and the compression of the modules 100 which are arranged in stacks is performed without any problem. In FIGS. 11 to 14 particularly advantageous embodiments of the sealing material ring 90 are shown.

Figure 11A:
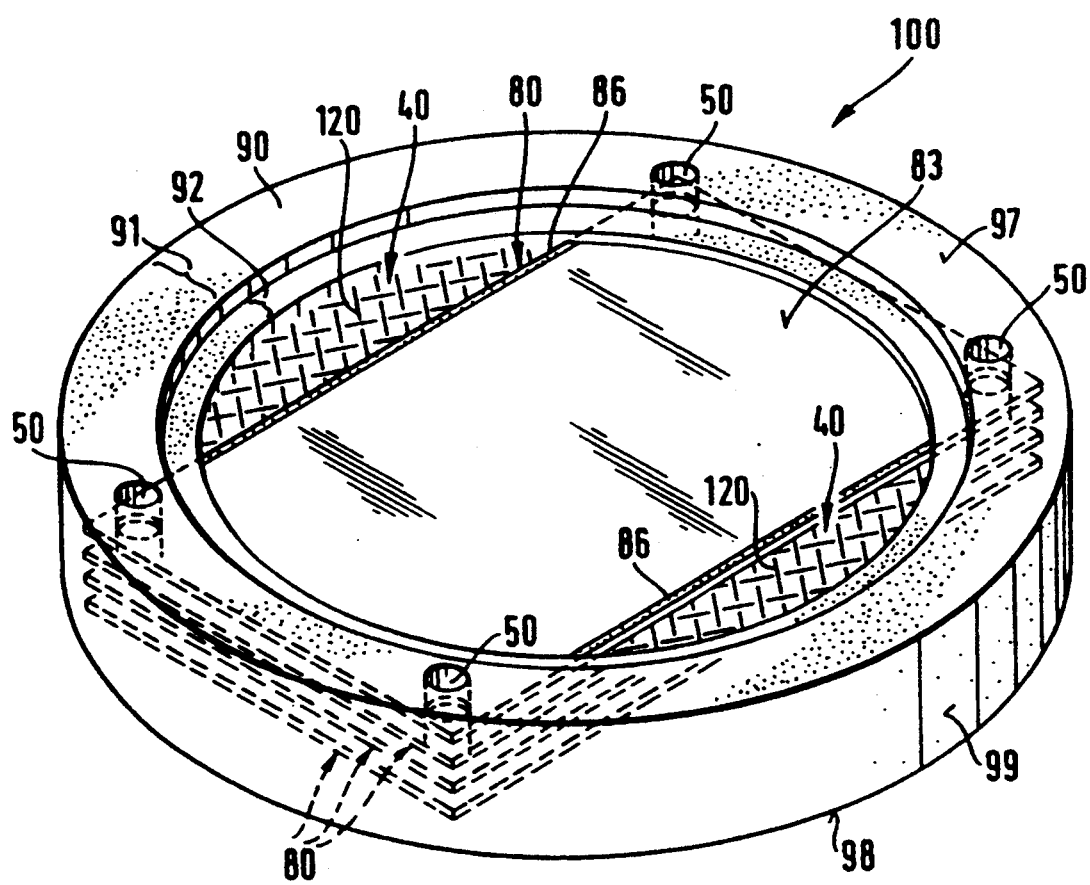
FIG. 11a shows a perspective view of a module, wherein an outer higher ring and an inner lower ring are formed on the surface of the sealing ring.
Figure 11B:
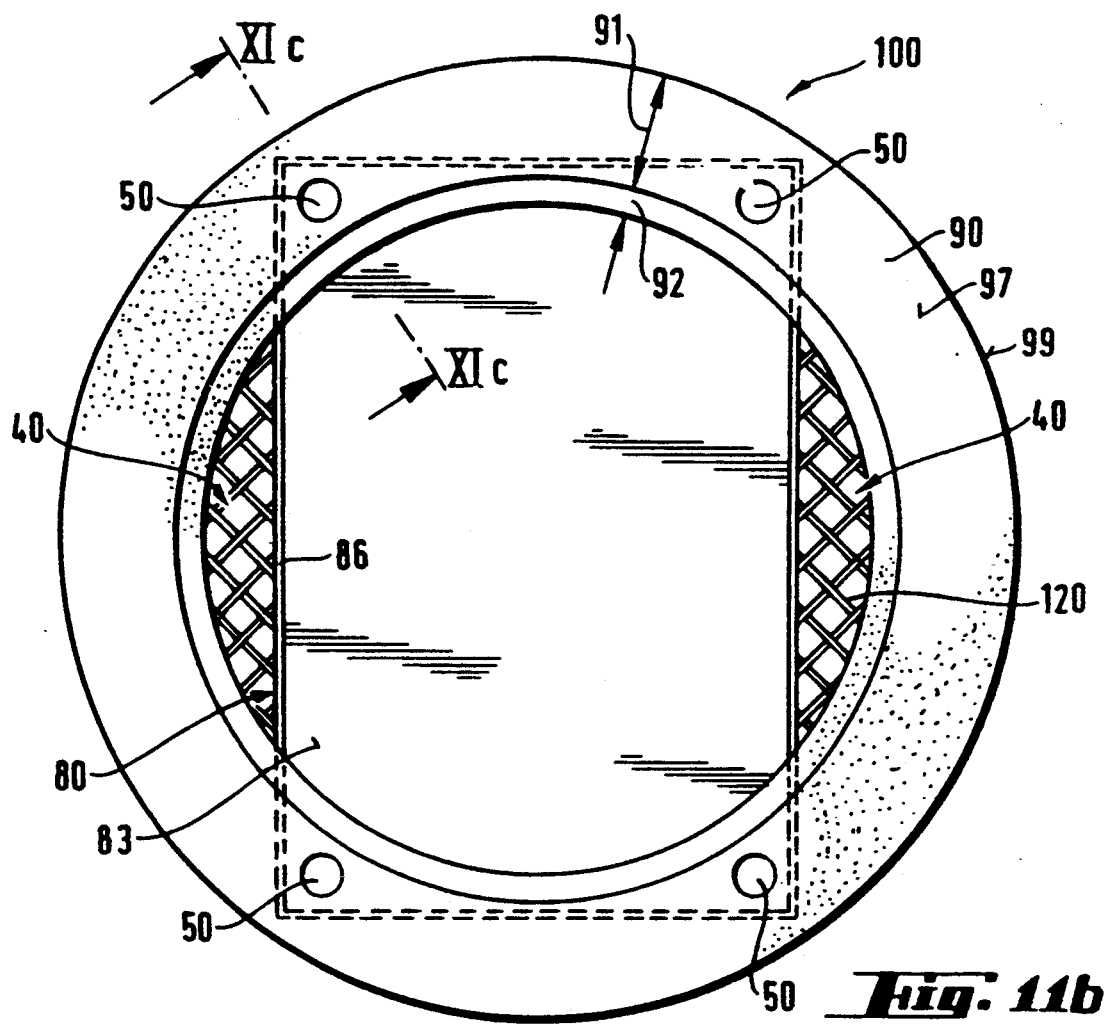
Figure 11C:
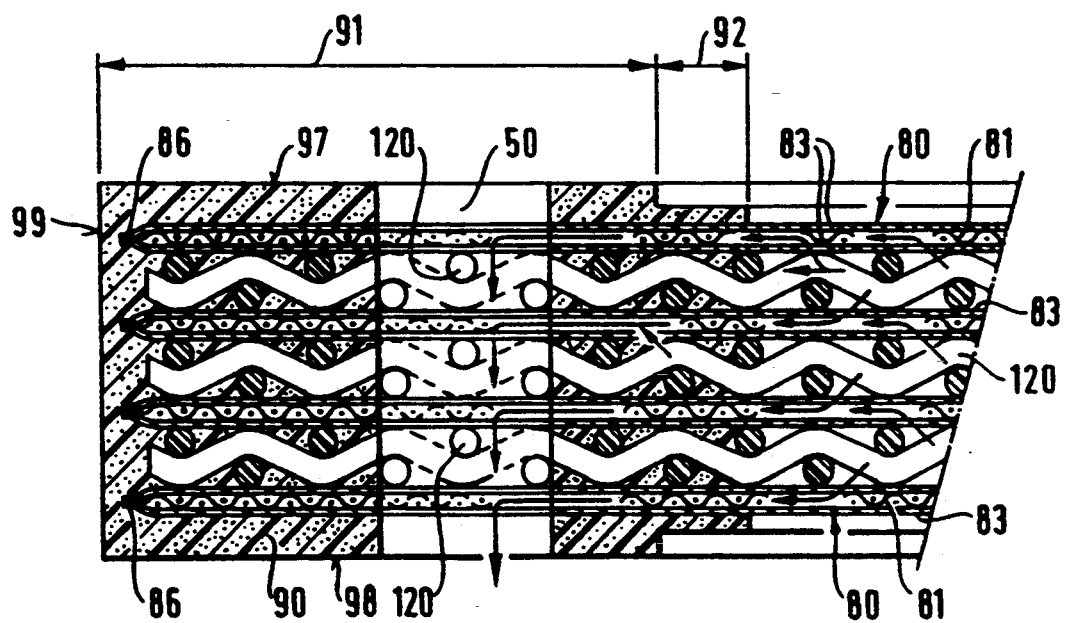
FIG. 11c shows a section through FIG. 11b along line XIc—XIc.

FIGS. 11a to 11c show a module 100, in the case of which on the surface of the sealing ring 90 an outer annular region 91 which is laminarly elevated and a corresponding inner lower region 92 are provided. FIG. 11c shows that in this case the filtrate channel 50 extends in the region of the outer higher sealing ring surface 91. The inner annular recess can receive corresponding sealing rings of elastic material which provide an additional sealing effect of the unfiltered material channel 40 when several modules 100 are compressed. The recesses for receiving additional seals are preferably provided both on the upper side 97 and on the lower side 98 of the sealing material ring 90 if the sealing rings are appropriately constructed, it is however sufficient to provide corresponding recesses only on one surface 97 or 98 of the module 100 in each case.

Figure 12A:
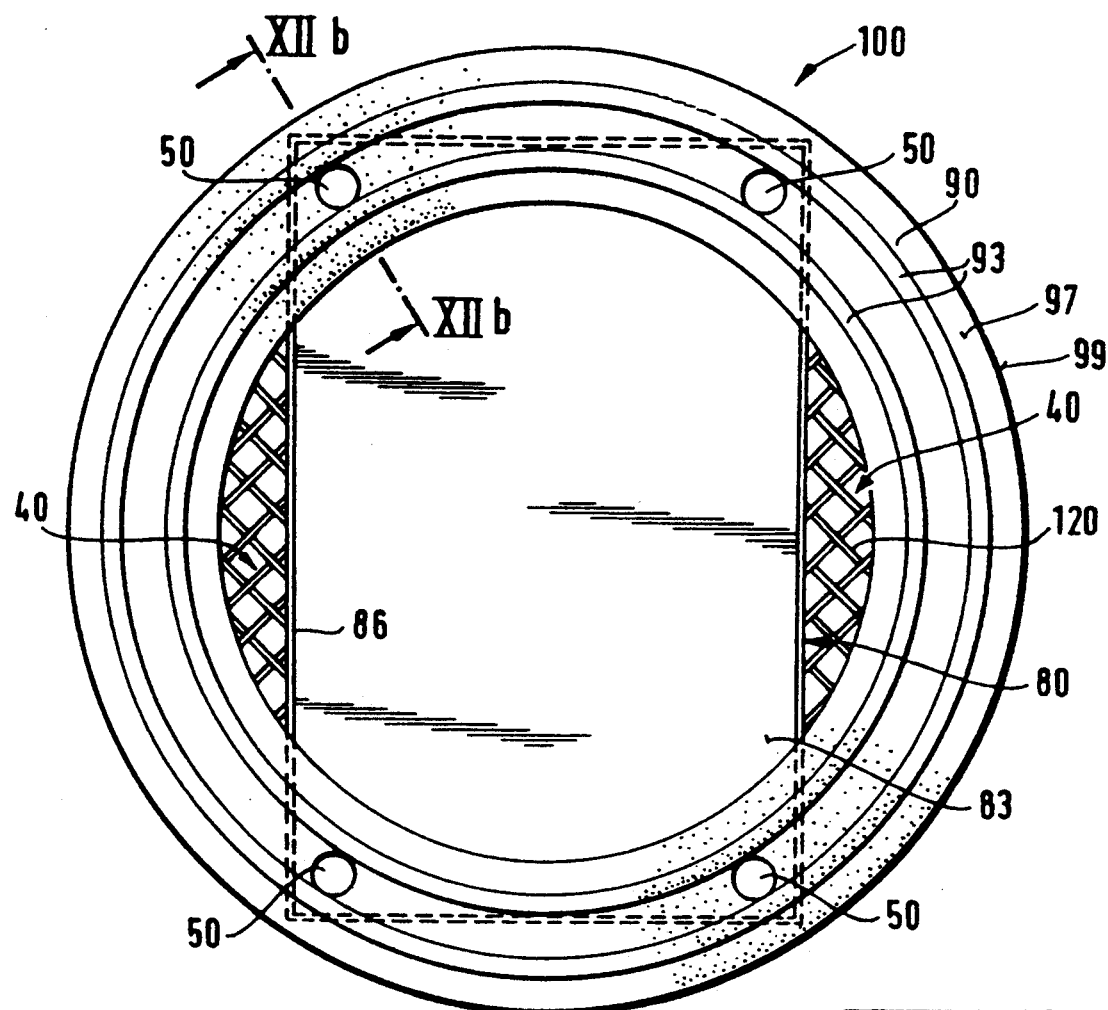
FIG. 12a shows the top plan view of a module according to the invention with two continuous annular beads.
Figure 12B:
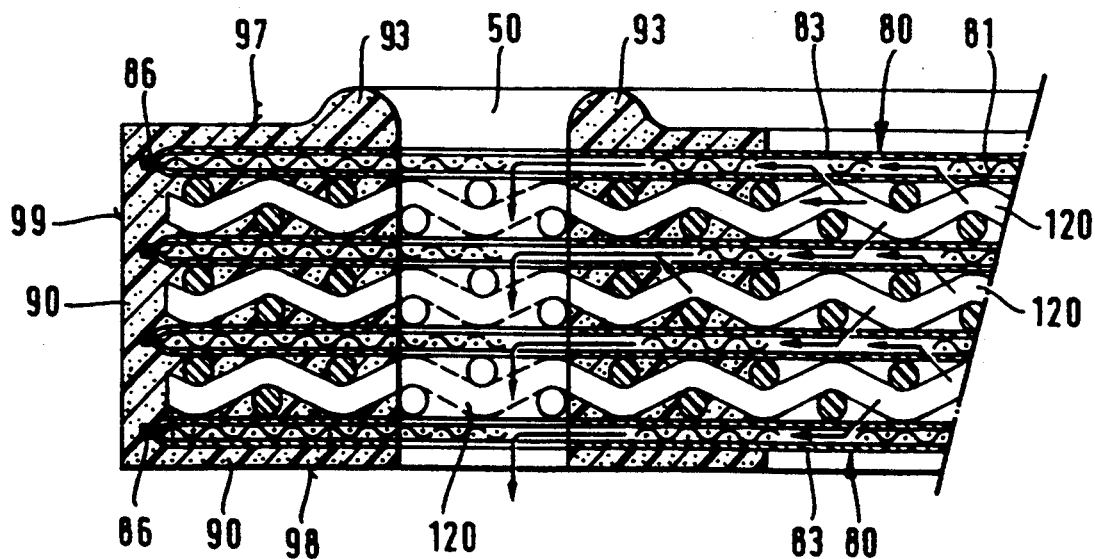
FIG. 12b shows a section through FIG. 12a along line XIIb—XIIb.

Further embodiments of the sealing ring 90 are shown in FIGS. 12a and 12b.

In these two Figures two annular elevations 93—one inner and one outer elevation—are shown which are integrally formed and extend along the entire periphery. This double annular peripheral bead represents an annular seal which serves to seal the modules 100 wherein the filtrate channel 50 is advantageously disposed between the two annular beads. In a preferred manner these peripheral elevated annular seals 93 are provided only on one surface 97 or 98 of the sealing material ring 90 of a module 100 and when a first module 100 is compressed they are pressed against the plane surface of a second module 100.

This construction enables the filtrate channel 50 and the unfiltered material channel 40 to be sealed very efficiently by simple means.

Figure 13A:
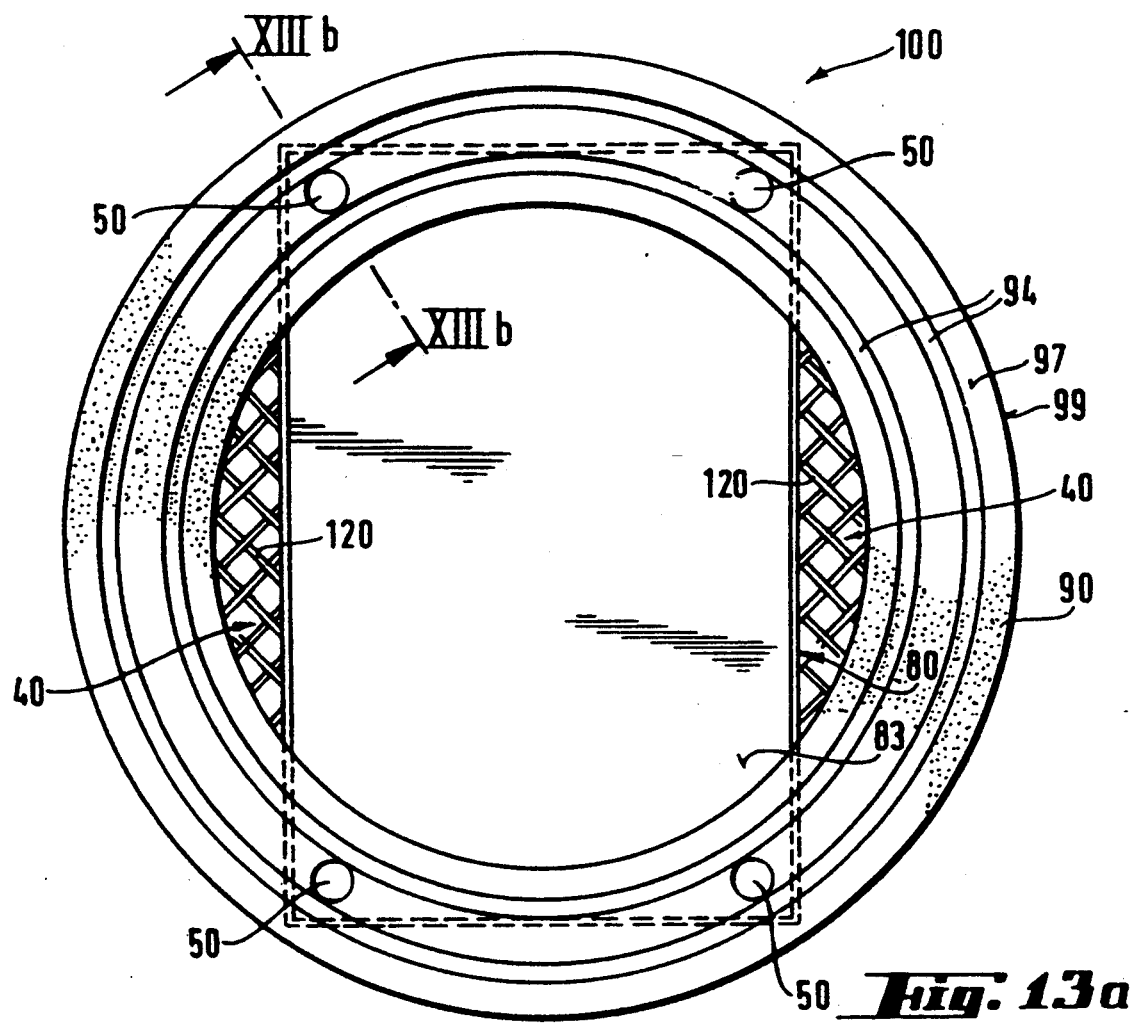
FIG. 13a shows similar to the illustration of FIG. 12a two integrally peripheral annular grooves in the surface of the sealing ring.
Figure 13B:
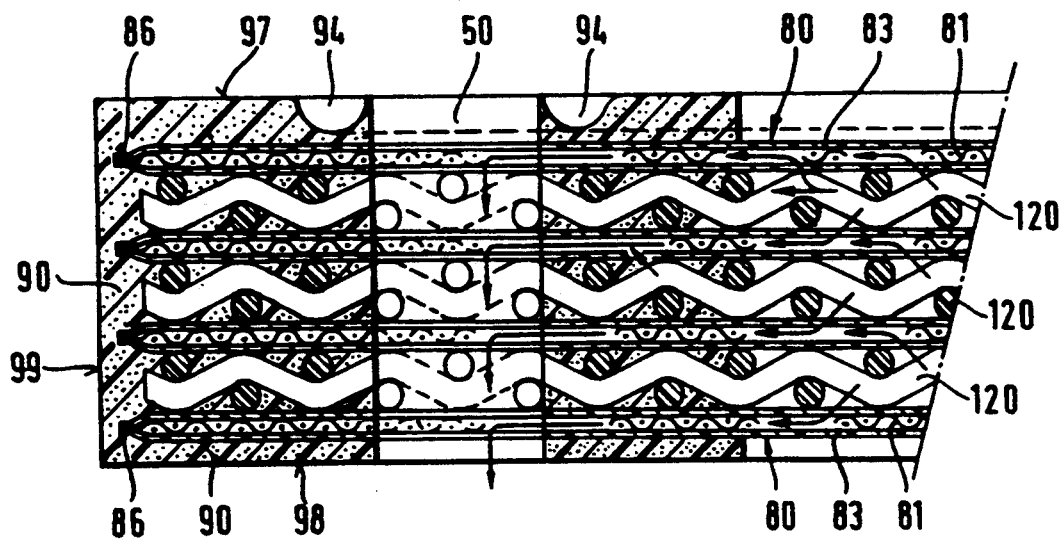
FIG. 13b shows a section through FIG. 13a along line XIIIb—XIIIb.
Figure 14:
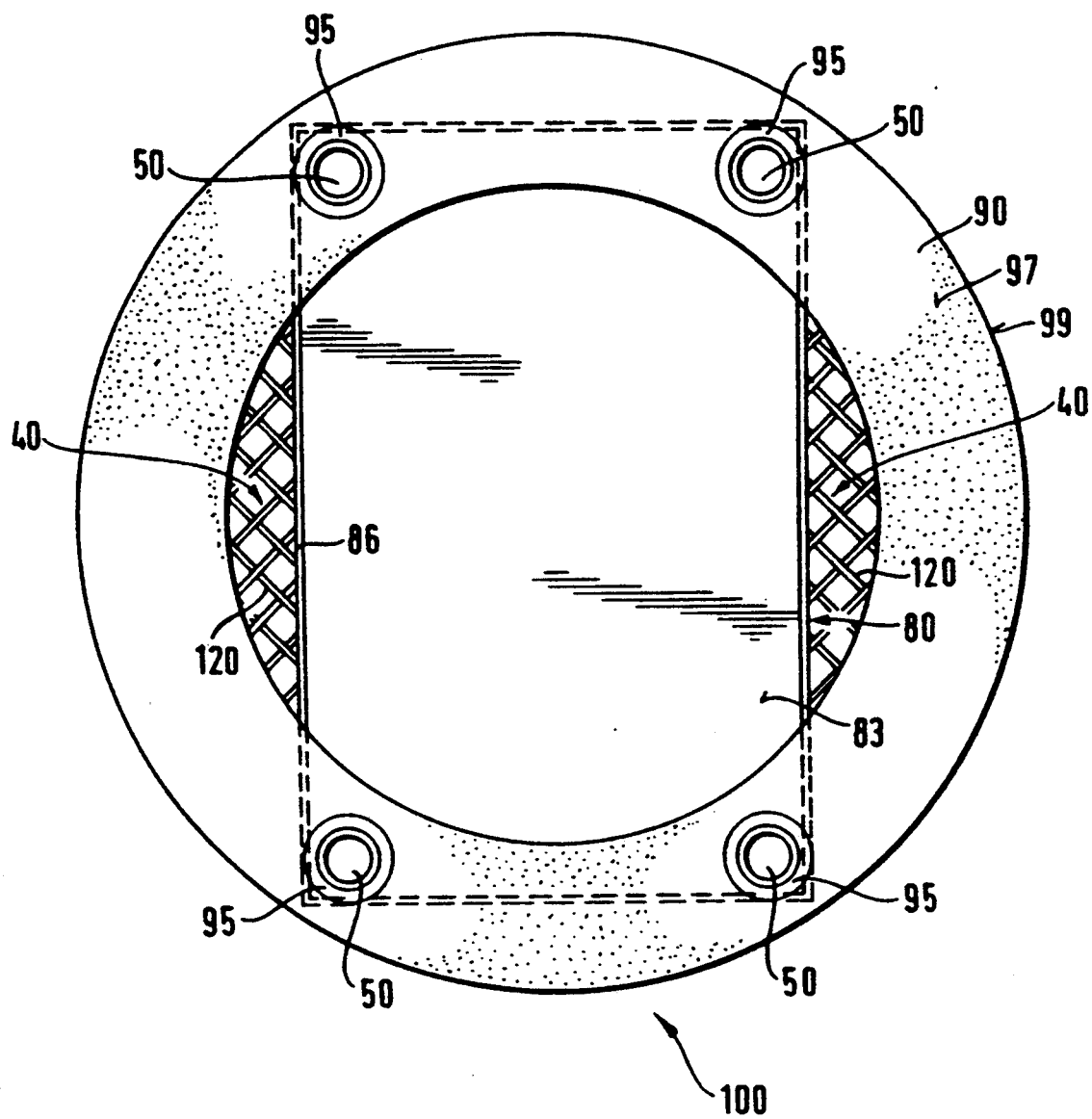
FIG. 14 shows the top plan view of a module according to the invention wherein projections or grooves extend about the filtrate channels.

Annular seals (annular beads) 93 which are constructed in an elevated form are appropriate in particular with elastic sealing materials. In the case of inelastic or rigid sealing materials it is suitable to provide one or preferably two peripheral annular grooves 94, as shown in FIGS. 13a and 13b. These peripheral annular grooves serve to receive seals of elastic sealing material wherein these seals may be provided on one side only of a module 100, similar to the elevated annular seals (annular beads) 93, such that in a particularly preferred case when two modules 100 are laid on top of one another the double inserted elastic additional seals press on the flat surface of the second module 100, a sealing effect being guaranteed; in this case gain the filtrate channel 50 is disposed between the two peripheral annular grooves 94.

Similarly to the peripheral annular elevations or grooves, the same regions of different heights 95 may extend only about the filtrate channel 50 (see FIG. 14) either on one or on both opposite surfaces 97, 98.

In this way it is possible to seal the filtrate channels 50 completely for example by pressing together several modules 100 with elevations which extend around the filtrate channels 50.

In the case of inelastic sealing material suitable seals of elastic material are evidently inserted into the grooves.

Figure 15:
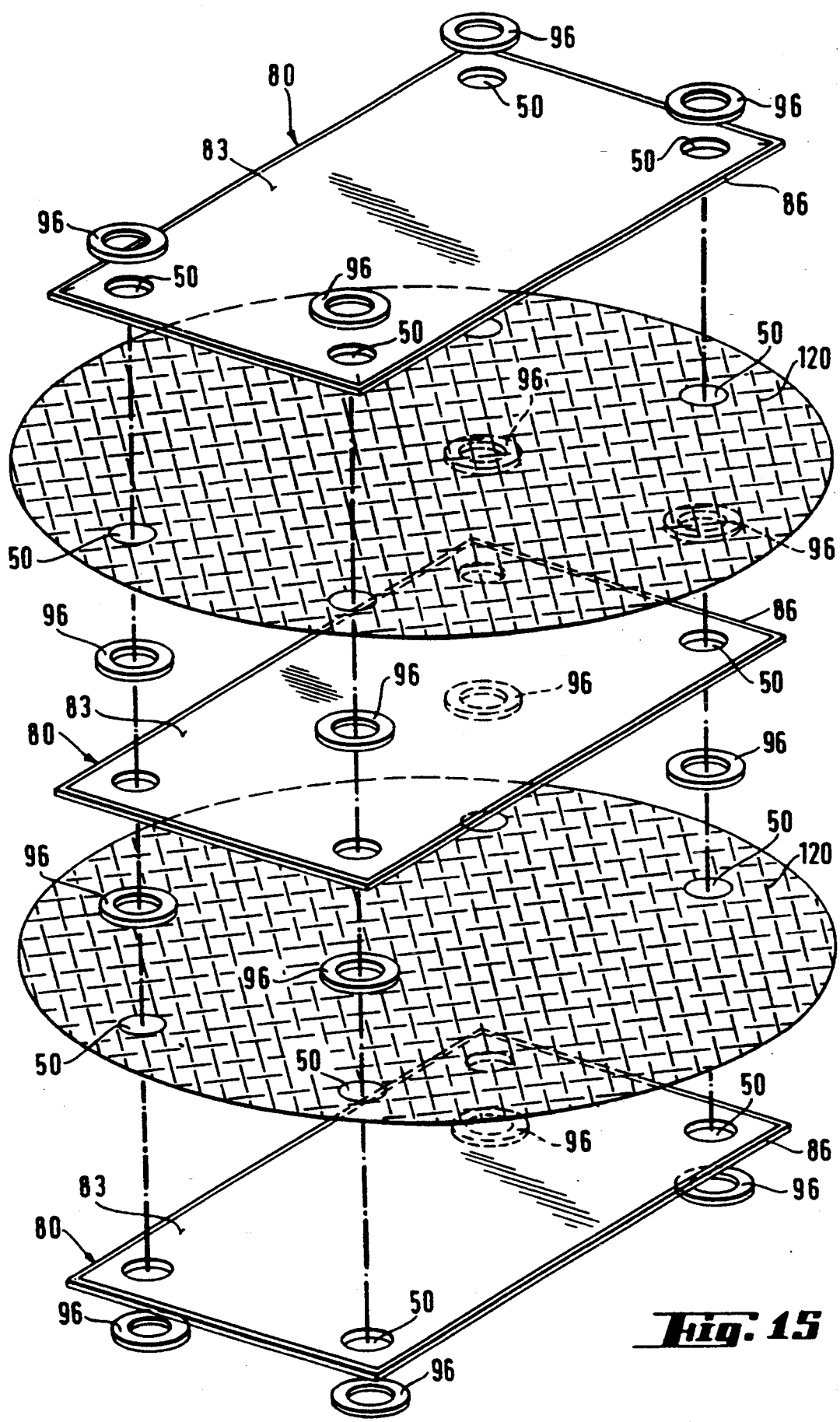
FIG. 15 shows an exploded view of a module, wherein between the individual filter units additional seals of an elastic sealing material are inserted.

A further possibility of additional sealing of the filtrate channel 50 is shown in FIG. 15. It is shown that additional, previously punched annular seals 96 of an elastic material are laid between two filter units 80 in each case at the point of the filtrate bores still to be disposed. A module with three filter units 80 and four filtrate channels 50 per filter unit thus has at its disposal 16 annular seals which are embedded in the sealing ring. In this way an additional sealing of the filtrate channel 50 which is also very effective can be achieved.

Figure 16:
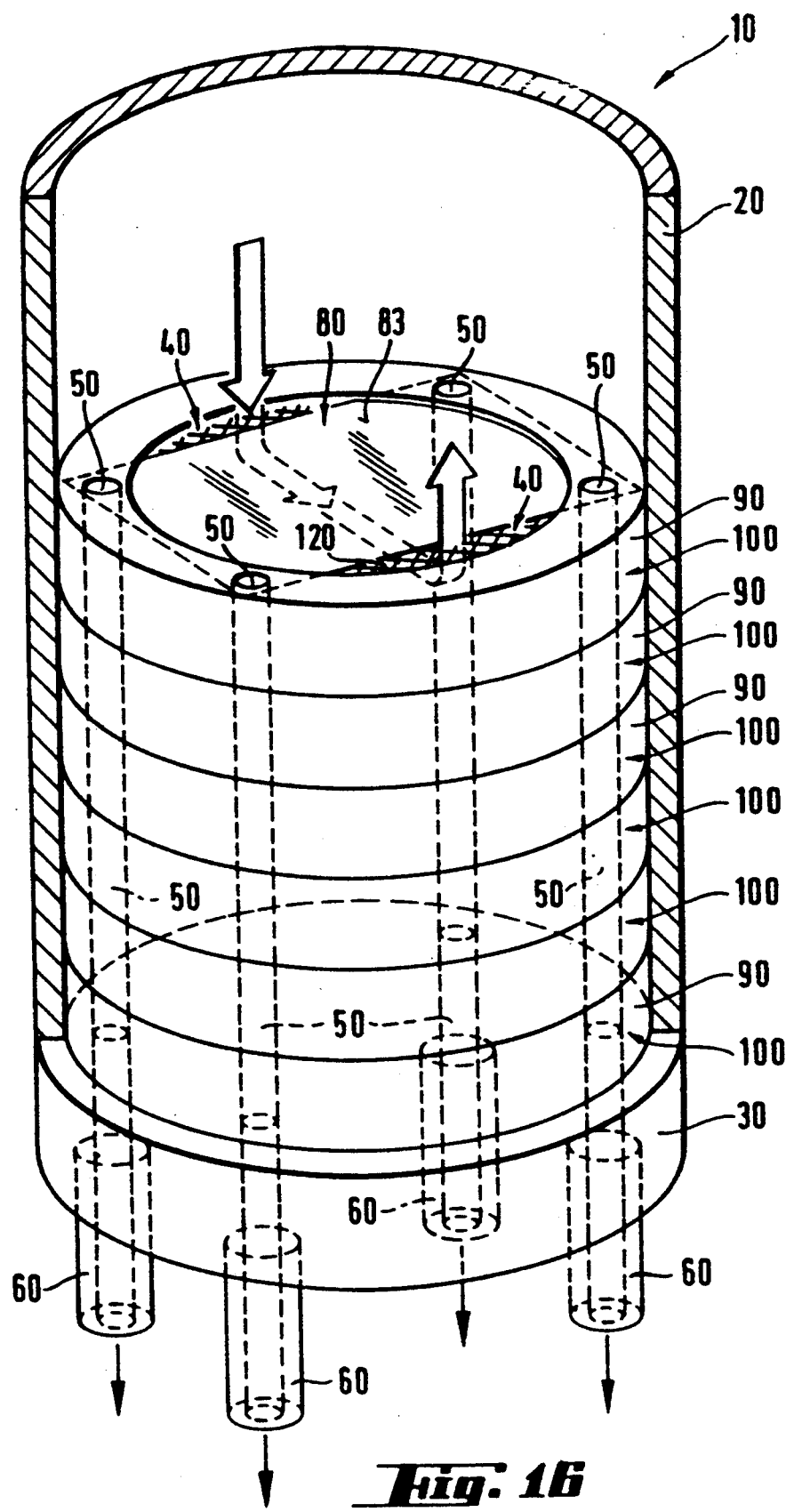
FIG. 16 shows a perspective view of a filtering device according to the invention with several filtration modules, wherein the casing is partially cut away.
Figure 17:
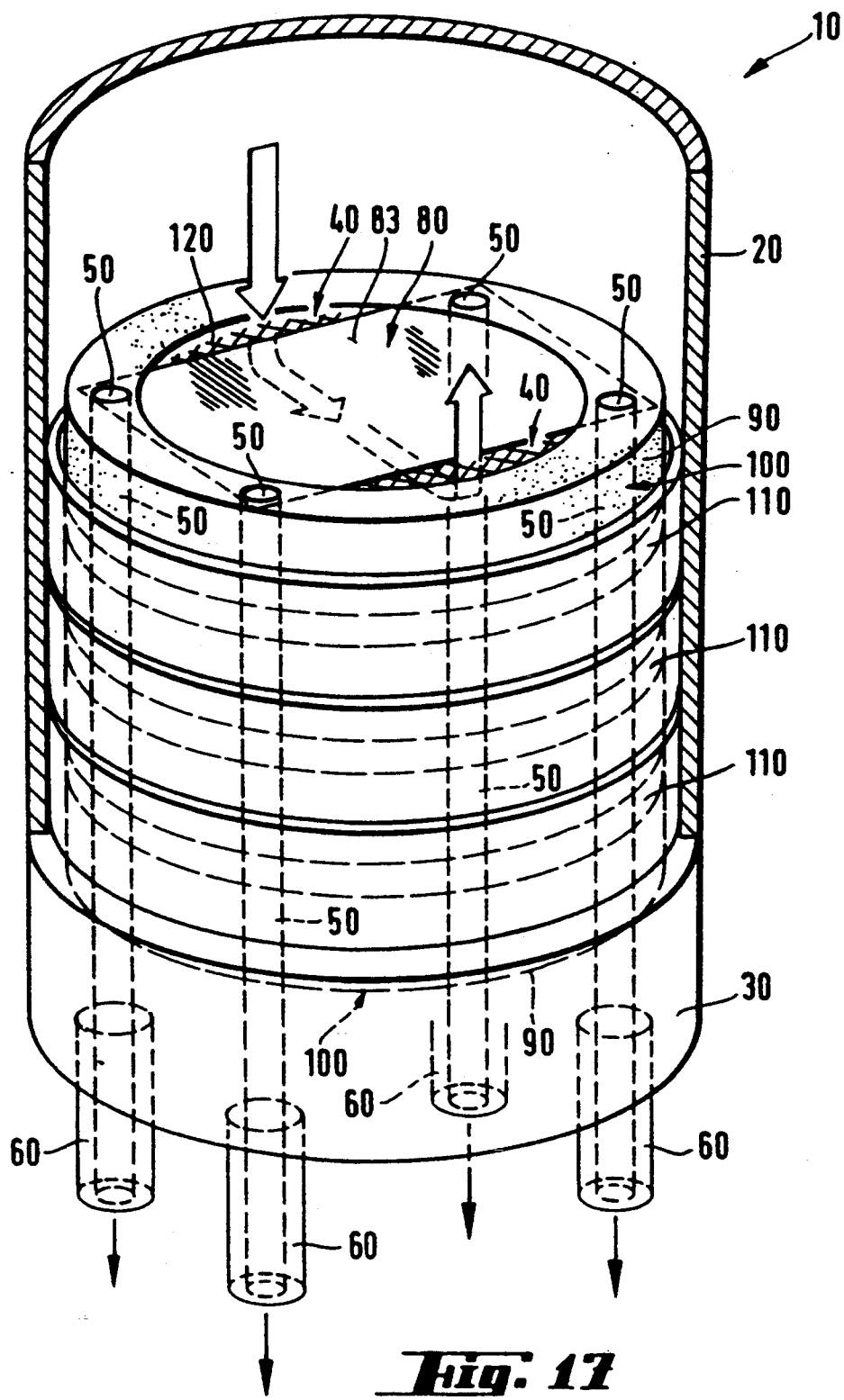
FIG. 17 shows a view according to FIG. 16, except with spacer plates laid between the modules.

FIGS. 16 and 17 explain the arrangement of a plurality of modules 100 according to the invention in a casing 20 to form a filtration device 10. It is shown that the individual modules are stacked in an aligned manner, wherein an end plate 30 with corresponding connections for the filtrate outlets 60 is provided to close off the casing. Furthermore, rectangular filter units 80, two unfiltered material channels 40, one four filtrate bores 50 are shown which are aligned relative to one another and thus form corresponding delivery channels, the unfiltered material channels being defined in conjunction with the inner edge surface of the sealing material ring.

In FIG. 17 there are disposed additional intermediate plates 110 which are arranged between two modules 100 in each case.

Figure 18A:
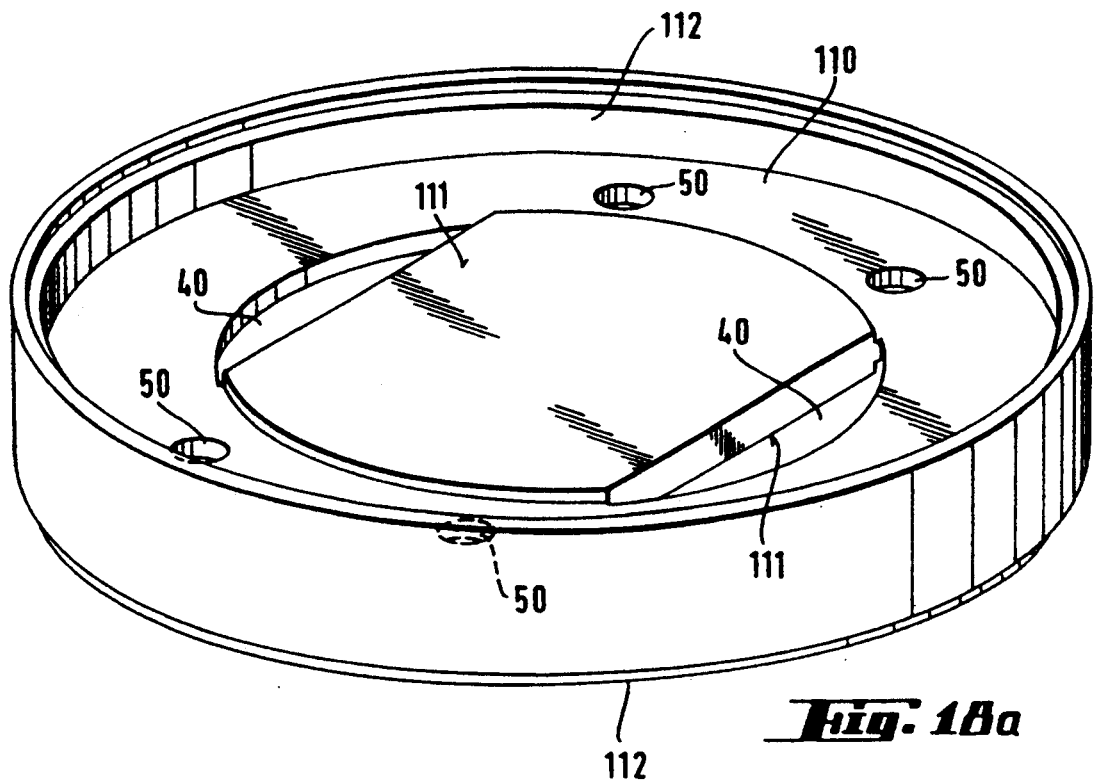
FIG. 18a shows a perspective view from above at an inclined angle of a spacer plate.
Figure 18B:
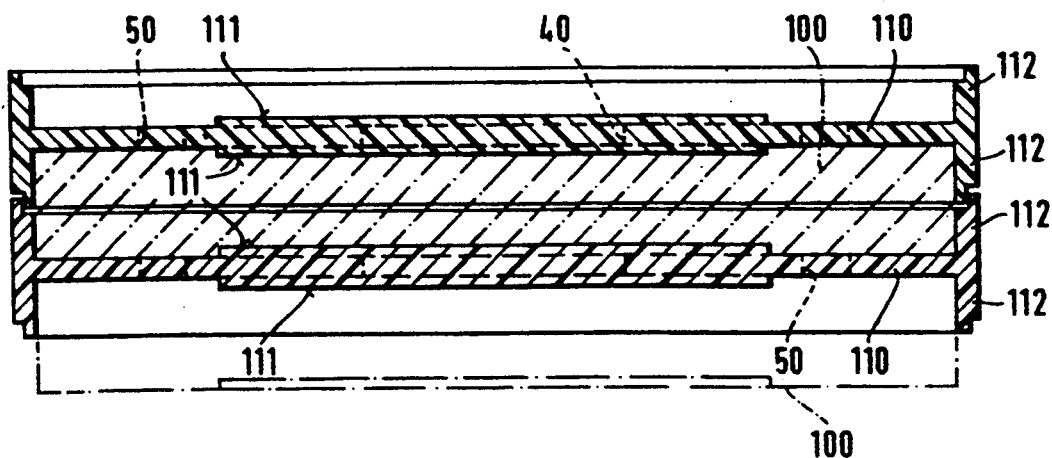
FIG. 18b shows a cross-section through an arrangement according to FIG. 18a, wherein a further spacer plate and modules are indicated for a better understanding.

In FIGS. 18a and 18b the construction of an intermediate plate 110 is shown in more detail. The intermediate plates 110 consists of an incompressible material which is inert with respect to unfiltered material and filtrates, such as synthetic materials or the like for example; their outer dimensions correspond to the annular shape of the outer edge 99 of the sealing material ring 90 and project over this outer edge along the entire periphery by a certain degree.

The basic body of the intermediate plates 110 which is substantially flat includes apertures at the points which correspond to the filtrate 50 or unfiltered material channels 40 of the modules 100 such that the delivery channels are not interrupted.

A bar or flange 112 which extends along the edge of the intermediate plate 110 projects over the two adjacent modules 100. In this connection the height of this bar 112 is altogether held at a lower level than the height of the sealing material ring 90, reduced by the thickness of the intermediate plate 110 in that region where the sealing ring 90 abuts, i.e. if a module 100 is disposed between two intermediate plates 110, the peripheral bars 112 of the two adjacent intermediate plates 110 do not contact each other and there is a predetermined distance between the plates. When the modules 100 are pressed together the sealing material ring 90 can be compressed only by a given amount until the peripheral outer edges of the intermediate plates 110 contact one another. Excess pressure is absorbed by the peripheral incompressible bar 112 of the intermediate plates 110. In the case of this embodiment the modulus of elasticity of the materials used for the sealing material ring 90 can be used for dimensioning the distances.

The intermediate plates 110, however, can also be used in a further advantageous manner.

The intermediate plate 110 for example comprises a defined reinforcement 111 in the basic body which corresponds to a region of the surfaces of the filter units 80 which are not surrounded by sealing material.

Since the edge of the sealing material ring may project over the uppermost or lowermost layer of the stack of filter units and spacers in a manner perpendicular to the stack plane, uncontrollable flow conditions may occur between adjacent modules 100 owing to the space between two modules 100 which differs from the space between the individual filter units 80. Thus, if the distance is larger for example, then the throughflow is considerably larger than in the case of the space openings between the filter units 80 in the module 100 itself. This differing distance is however fully compensated by the defined reinforcement 111, since an exact abutment of the intermediate plate 110 on the uppermost filter unit 80 or the uppermost spacer 120 of the module 100 is brought about, which spacer thus abuts on the surface of the uppermost filter unit 80 at a predetermined distance, such that defined gap heights are produced.

Similarly to the intermediate plates, the analogous end plates 30 can also be used for optimum operational performance of the filtration devices 10. This is explained by way of example in FIG. 19.

If there is provided at the end of a row of modules a special end plate 31 which connects via channels 33 and a bore 32 the uppermost unfiltered material channel 40 of the lower row of modules 100 to the lower unfiltered material channel 40 of the upper row of module rows which are disposed one below the other, wherein the filtrate openings 34 which are provided for the respective module row and the respective filtrate outlets 60 being visible, the modules 100 are flowed against in a parallel manner within one row, however, the two module rows are operated in series. Owing to the decreased pressure reduction between module inlet and outlet and the relatively large unfiltered material channels 40, it is attempted that the individual modules 10 are flowed against in parallel within one row, however, to operate several, for example three module rows, in series by using special end plates such that the volume flow per square meter of filter surface is much more favorable.

The above explanations show that the use of the module 100 according to the invention together with intermediate plates 110 or end plates 30, 31, in a filtration device 10 has numerous advantages.

The present invention is, of course, in no way restricted to the specific disclosures of the specification and drawings, but also encompasses any modifications within the scope of the appended claims.

What we claim is:

1. A method of producing a module for crossflow filtration, with said module including at least two multilayer filter units, which are stacked on top of one another and are separated from one another by a respective spacer, and with said module having at least one channel for unfiltered material and at least one filtrate channel that connects said filter units, said method including the steps of:

successively alternately stacking a plurality of spacers and filter units;

aligning and fixing the thus-formed stack arrangement in a casing mold such that said filter units are disposed above one another in an essentially coinciding manner;

introducing into said casing mold a given quantity of viscous sealing material to produce a ring of sealing material having a desired thickness and width, such that at least one edge section of said filter units is spaced from said sealing material ring to form said at least one channel for unfiltered material inwardly of said sealing material ring;

centrifuging said casing mold with said stack arrangement and viscous sealing material until said sealing material is prehardened;

final hardening said sealing material; and disposing at least one bore through said sealing material and perpendicular to a plane of said stack arrangement to form said at least one filtrate channel entirely in said ring of sealing material.

2. A method according to claim 1, in which said centrifuging step comprises centrifuging said sealing material at an outer edge of said filter units and sealingly introducing said sealing material between said filter units and said spacers.

3. A method according to claim 2, wherein depending upon the centrifugal force that is applied, one of the following can occur: surface wetting with sealing material in a wall region of filter materials, penetration of sealing material into filter material, and complete penetration of sealing material through at least one of said filter units and spacers in selected edge zones.

4. A method according to claim 1, in which said centrifuging step comprises forming regions of different heights on at least one of an upper side and a lower side of said ring of sealing material by appropriate selection of said casing mold.

* * * * *